May 28, 1946.　　　R. H. MORGAN ET AL　　　2,401,288
METHOD OF AND APPARATUS FOR MEASURING RADIATIONS
Filed May 12, 1943　　　3 Sheets-Sheet 2

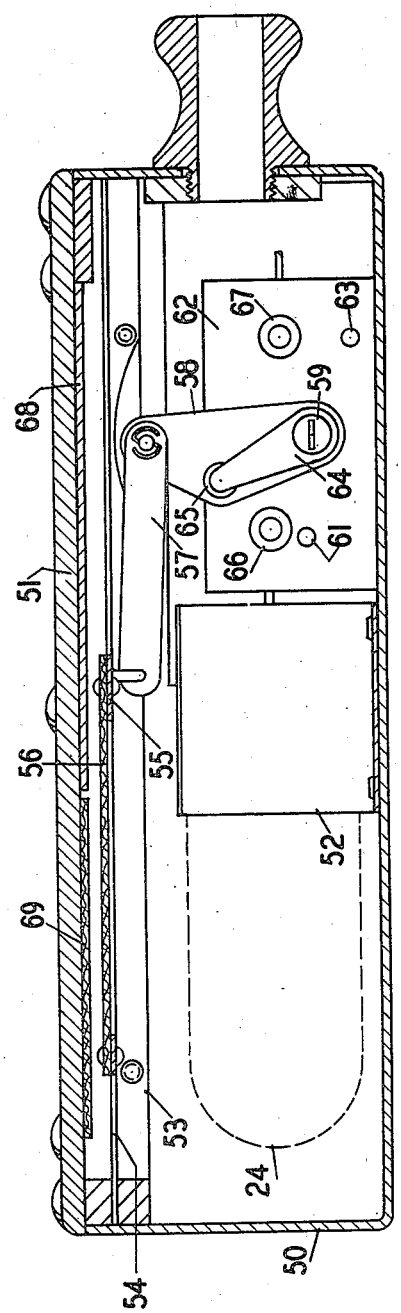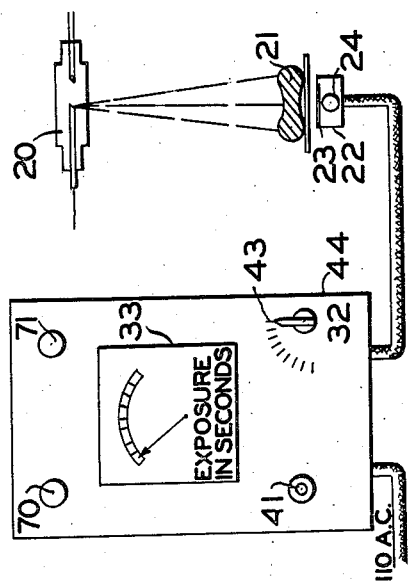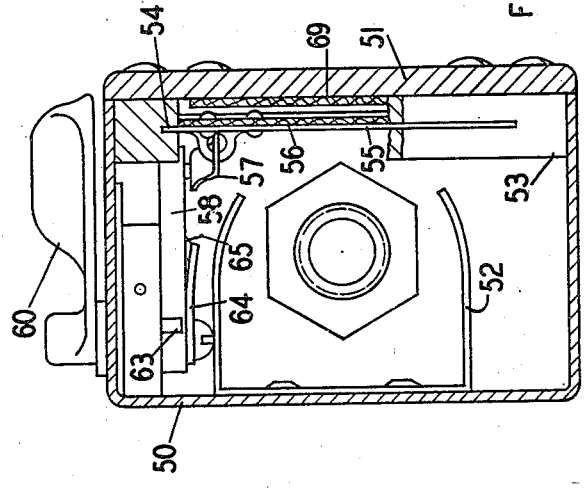

Russell H. Morgan　INVENTORS
Paul C. Hodges
BY

May 28, 1946.  R. H. MORGAN ET AL  2,401,288
METHOD OF AND APPARATUS FOR MEASURING RADIATIONS
Filed May 12, 1943  3 Sheets-Sheet 3

Russell H. Morgan  INVENTORS
Paul C. Hodges
BY

Patented May 28, 1946

2,401,288

UNITED STATES PATENT OFFICE 2,401,288

METHOD OF AND APPARATUS FOR MEASURING RADIATIONS

Russell H. Morgan and Paul C. Hodges, Chicago, Ill., assignors to the United States of America, as represented by the Director of the Office of Scientific Research and Development Application May 12, 1943, Serial No. 486,704

20 Claims. (Cl. 250—83.3)

This invention relates to a system for measuring the intensity of electromagnetic radiations, and more particularly to a system for correctly exposing Roentgen photographs.

One of the most important factors in the production of consistently excellent photographs is correct exposure. In the field of photography by visible light this problem has been greatly simplified by the invention of a photometer or light meter. However, in exposing X-ray photographs, also called "Roentgenograms," operators have been forced to estimate exposures by merely measuring the thickness of the subject because no convenient and accurate exposure meter was available.

One of the objects of the present invention is to provide a system which will measure the intensity of electromagnetic radiation to which a film is exposed and thereby will serve as an X-ray exposure meter.

Another object of the invention is to provide a very sensitive radiation detector whose responses to Roentgen radiation will parallel those of Roentgen films, which may be exposed with or without intensifying screens, through the complete range of radiation quality used in medical roentgenography.

Still another object of the invention is to provide an exposure meter which will indicate the correct exposure directly in seconds. Other objects and advantages will be discussed.

In accordance with our invention a photoelectric cell or phototube assembly is placed in back of the object to be roentgenographed. Roentgen rays after passing through the object impinge on a fluorescent screen, causing the said screen to emit visible radiation. In response to this visible radiation a small current, which is proportional to the intensity of the visible radiation, flows through the phototube and is recorded by a microammeter, which has a scale calibrated directly in terms of exposure time so that when a film is placed behind the object, exposed with an X-ray beam identical to that with which the exposure meter reading was taken and for a duration indicated by the exposure meter, the film will receive the proper quantity of radiation, which will insure correct exposure.

In order that the invention may be more fully understood, reference will be made to the accompanying drawings, in which:

Fig. 1 is a schematic diagram of the exposure meter showing the method of use.

Fig. 5 is an elevation view of the phototube assembly.

Fig. 6 is a cross-sectional view of the phototube assembly taken at line 6—6 of Fig. 7.

Figure 2:
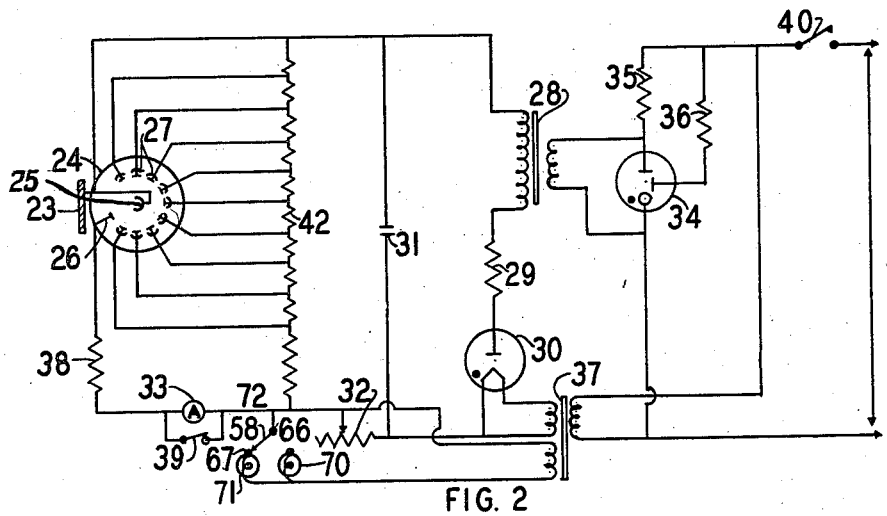
Fig. 2 is a detailed schematic diagram of the exposure meter.

The system illustrated in Fig. 1 comprises a Roentgen tube 20 of any suitable construction. Mounted successively below said tube are subject 21 which is to be roentgenographed and the phototube assembly 22. Within the phototube assembly are the fluorescent screen 23 and a multiplier phototube 24.

When Roentgen rays from the tube 20 pass through the subject 21 and impinge upon the fluorescent screen 23, the said fluorescent screen 23 emits visible radiation to which the phototube 24 is sensitive. In response to the visible radiation, current flows through the phototube 24 and is recorded by the microammeter 33 mounted on the panel 43 of the instrument case 44. Since the visible radiation emitted from the screen 23 is proportional to the intensity of the Roentgen rays and the current flowing through the phototube 24 is proportional to the visible radiation, deflections of the microammeter 33 therefore are proportional to the intensity of the Roentgen rays. In order that the exposure meter may be used as a direct reading instrument, the scale of the microammeter is calibrated directly in terms of exposure time.

For satisfactory operation of the exposure meter, we have found that when films are to be exposed with intensifying screens the fluorescent screen 23 should be of one type and when the films are to be exposed without intensifying screens the fluorescent screen should be of another type as will be pointed out more in detail hereinafter. The pilot-lights 70 and 71 on the front panel 43 of the instrument case 44 indicate which type of fluorescent screen is over the phototube 24 at any particular time.

A more detailed diagram of the electrical circuit is shown in Fig. 2. The phototube 24 is the so-called multiplier type. The tube contains a light-sensitive cathode 25, an anode 26, and nine electron mirrors or dynodes 27 which amplify by secondary emission the current developed at the photocathode 25. The sensitivity of this phototube is very high; even when activated by small radiation intensities employed in roentgenography, its current output is several microamperes. Phototube sensitivity may be controlled by varying the potential applied to the entire tube or to one of the dynodes singly. A multiplier phototube of this type is described in an article by J. A. Rajchman in vol. 13, pages 20 to 24, of the 1940 edition of Electronics.

The source of potential for the phototube 24 is obtained from a step-up transformer 28 through the resistor 29, the rectifier tube 30, the filter condenser 31 and the variable resistor 32. The adjustment of the resistor 32 varies the potential on the phototube 24, thereby controlling the sensitivity of the said phototube. The dial of the resistor 32 is calibrated in terms of film-speed numbers. Correct exposure technic is always indicated by the exposure meter, regardless of the brand of film being used, by merely setting the dial at the number corresponding to the emulsion speed of the film. The primary winding of the transformer 28 obtains its power from 110-volt A. C. commercial lines. The voltage to the primary of the transformer 28 is stabilized against fluctuation by the gaseous discharge tube 34 which is in circuit with the resistors 35 and 36. The filament of the rectifier tube 30 is supplied also from 110-volt A. C. commercial lines through the transformer 37. In circuit with the anode 26 of the phototube 24 is the microammeter 33, which measures the output current of the phototube. The limiting resistor 38 protects the microammeter 33 from overload. The contacts 39 short-circuit the microammeter 33 when the said microammeter is not in use. The contacts 40 control the power to the exposure meter. These contacts 39 and 40 are part of a double-pole double-throw switch 41 (see Fig. 1) so that when 40 is opened, 39 is closed.

Figure 7:
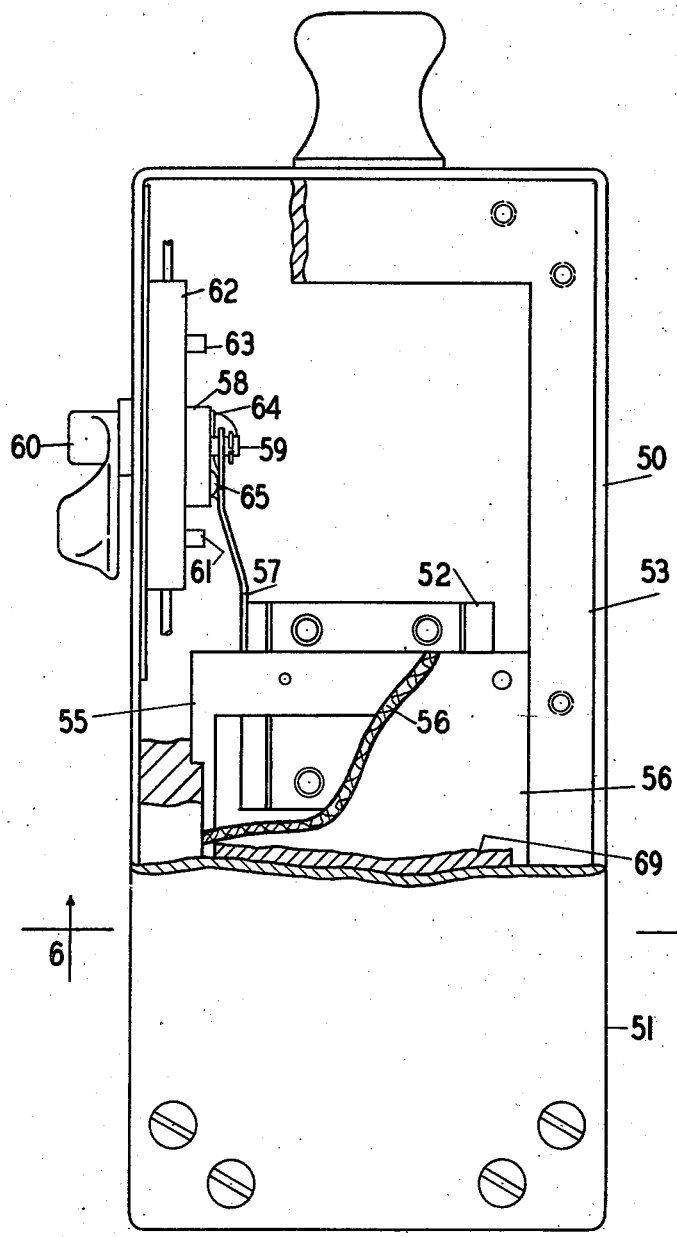
Fig. 7 is a top view of the phototube assembly with the top partially removed.

The pilot-lights 70 and 71 are also supplied with power from a winding on the transformer 37. One or the other of these lights is placed in circuit through the single-pole double-throw switch 72, which is connected to a lever for inserting either one type or another type of fluorescent screen over the phototube 24. The construction of the switch 72 and its connection with the lever are shown in Figs. 5, 6 and 7 and will be described in detail hereinafter. It may be noted at this piont, however, that when a screen of one type is over the phototube one of the pilot-lights is in circuit, whereas the other pilot-light is in circuit when the screen of the other type is over the phototube.

In order for the exposure meter to give satisfactory results it is essential that the meter have the same response throughout the portion of the X-ray spectrum used for roentgenography as does the film used. The response of the film may be expressed in terms of the so-called "film speed factor," which is determined from the equation $$S_e = \frac{d}{E_{1.0}}$$

where $S_e$ is the film-speed factor, $d$ is an arbitrary constant of such magnitude that the various values of $S_e$ fall within a convenient range of numbers, and $E_{1.0}$ is the exposure, determined from exposure meter readings, required to produce a film density of 1.0 (film density being measured by densitometric examination). Since the values of $E_{1.0}$ employed in the above equation are determined from measurements derived from exposure meter readings, which do not necessarily represent the photographic flux densities received by the films, it follows that the speed factor, $S_e$, of a film will not be independent of radiation quality unless the spectral response of the film is identical to that of the exposure meter. It has been found that to secure satisfactory roentgenograms the film-speed factors must be maintained with ±10 percent of constant levels through the entire range of radiation quality used in medical roentgenography. The problem is further complicated, because it is known that the responses of films exposed to Roentgen rays directly do not always parallel those of films exposed with intensifying screens.

In order, therefore, to insure that the spectral response of the exposure meter parallels that of the film throughout the range of radiation quality used in medical roentgenography to thus attain the constant level film-speed factors desired, we have found that the fluorescent screens associated with the phototube must be properly related to the film employed.

In the preferred embodiment the exposure meter is provided with two fluorescent screens. If the exposure is to be determined for a non-screen film, a zinc-sulphide fluorescent screen such as a "Fluorazure" screen is used in front of the phototube. If the exposure is to be determined for a film exposed with an intensifying screen, the zinc-sulphide screen alone used with the phototube will not give a level film-speed factor; instead a filter in combination with either a front type calcium-tungstate screen or a zinc-cadmium-sulphide screen such as a Patterson Type B fluoroscopic screen is used with the phototube, and this will be found to give a level response over the spectrum for films exposed with intensifying screens. The filter may be of metal, for instance a 0.5 millimeter aluminum filter, or it may be a second fluorescent screen.

Figure 3:
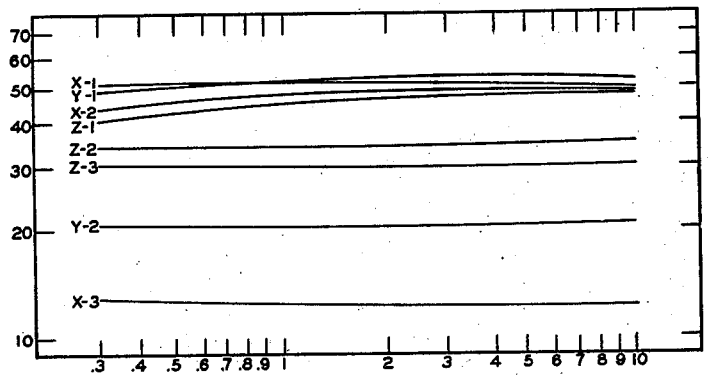
Fig. 3 is a graph showing the relative speed factors of a typical film exposed with eight different intensifying screens.
Figure 4:
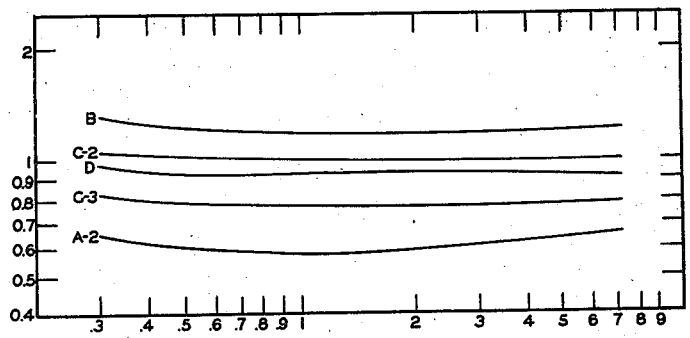
Fig. 4 is a graph showing the relative speed factors of several films exposed without intensifying screens.

In Fig. 3 are shown curves representing the speed factors of a typical commercial brand of film exposed with eight different commercial intensifying screens, when exposure determinations were made with an exposure meter employing a zinc-cadmium-sulphide fluorescent screen with an overlying aluminum filter 0.5 mm. in thickness. Further experiments showed that a calcium-tungstate screen would give similar results to that of the zinc-cadmium-sulphide screen. The constancy of these curves discloses the excellent results obtained if such screens are employed in the exposure meter when films are to be exposed with intensifying screens. In Fig. 4 are shown curves representing speed factors of five typical commercial films exposed without intensifying screens. The various speed factors were determined from measurements made with an exposure meter employing a zinc-sulphide fluorescent screen. These curves show a level response over the entire range of radiation quality and indicate that a zinc-sulphide screen should be used in the exposure meter when films are to be exposed without intensifying screens.

The mounting arrangement of the phototube assembly is disclosed in Figs. 5, 6 and 7. The phototube 24 and the resistor network 42 are mounted within the metal case 50 covered by the Bakelite top 51. The phototube 24 is held in position by the spring clip 52. Around the open edge of the case 50 is the frame 53 which serves to unite the case 50 and the Bakelite top 51. The frame 53 also includes a slotted track 54 in which the frame 55 is free to slide. The frame 55 is a support for the zinc-cadmium-sulphide screen 56 and is connected by the link 57 to the arm 58, the axle 59 and the lever 60 located outside the case 50. Counter-clockwise motion of the arm 58 is arrested by the pin 61 while clockwise motion is arrested by the pin 63. Also positioned on the arm 58 are the spring 64 which co-acts with steel ball 65 and the recessed contacts 66 and 67. When the handle 60 is turned to its most clockwise position the zinc-cadmium-sulphide screen lies over the sensitive surface of the phototube and is held in position there by the action of the spring 64 pressing the steel ball 65 into the recessed bushing 66. When the handle 60 is turned to its most counterclockwise position the zinc-cadmium-sulphide screen then lies away from the sensitive surface of the phototube 24 and is locked in position by the steel ball 65 and the recessed bushing 67. The zinc-cadmium-sulphide screen is prevented from radiating visible light when it is removed from above the phototube 24 by the presence of the lead sheet 68.

Mounted in a fixed position on the Bakelite top 51 directly over phototube 24 is the zinc-sulphide fluorescent screen 69. The Roentgen-ray filtration produced by a zinc-sulphide screen is very nearly equal to that produced by 0.5 mm. of aluminum. Accordingly when the handle 60 is in its most clockwise position, so that both screens 56 and 59 are between the source of radiations and the phototube 24, the exposure meter will perform satisfactorily for determining the exposure of films to be exposed with intensifying screens. When the handle is turned in a counterclockwise position screen 56 is moved back and with screen 59 alone over the phototube the exposure meter will perform satisfactorily for determining the exposure of films to be exposed without intensifying screens.

The arm 58 and the recessed contacts 66 and 67 constitute the single-pole double-throw switch 72 in Fig. 2.

To use the X-ray exposure meter the patient is placed upon the roentgenographic table, the anatomical structure to be radiographed is placed over the phototube assembly 22 and the Roentgen machine is adjusted to any reasonable voltage for the structure under examination. Then the potentiometer 32 is rotated to the film-speed number of the film to be used, the proper fluorescent screen combination for the film to be used is placed over the phototube by means of the lever 60, and a test exposure is made. During the exposure the deflection of the microammeter 33 is read. This reading of the microammeter is the proper exposure time for the film. Accordingly when a film is placed in the film tray of the roentgenographic table, the timing mechanism of the Roentgen machine adjusted to give an exposure time as indicated by the microammeter, and the film then exposed with a Roentgen beam identical to that with which the exposure meter reading was taken, a diagnostically excellent roentgenogram will be assured.

Obviously many changes and modifications in the described system will be apparent to those skilled in the art. The description is intended to be illustrative only, and the scope of the invention is defined by the following claims:

What is claimed is:

1. A device for determining correct Roentgen exposure for a chosen Roentgen film necessary for a satisfactory roentgenogram of a subject comprising a phototube, means for measuring the output of said phototube and a fluorescent screen mounted between the phototube and the source of Roentgen radiation and on the opposite side of said subject from the source of Roentgen radiation, said device having the same response to Roentgen rays throughout the X-ray spectrum as does the said Roentgen film.

2. A device for determining correct exposure for a Roentgen film necessary for a satisfactory roentgenogram of a subject comprising in combination a fluorescent screen for receiving a portion of the energy in the form of X-rays passing through said subject and giving it off in the form of visible radiations, a phototube for receiving said visible radiations from the fluorescent screen and means for measuring the output of said phototube, said phototube and screen combination having a response to Roentgen radiation parallel to the response of said Roentgen film over the portion of the X-ray spectrum used in Roentgenography.

3. A device for determining the correct Roentgen exposure for a Roentgen film necessary for a satisfactory roentgenogram of a subject comprising a phototube, means for measuring the output of said phototube and a fluorescent screen mounted between the phototube and the source of Roentgen radiation and on the opposite side of said subject from the source of the Roentgen radiation, the said screen being related to the film to produce a substantially constant level film-speed factor throughout the range of radiation quality employed.

4. A device for determining the correct Roentgen exposure for a Roentgen film necessary for a satisfactory roentgenogram of a subject comprising a phototube provided with a cathode, an anode and a series of dynodes, means for measuring the output of said phototube and a fluorescent screen mounted between the phototube and the source of Roentgen radiation and on the opposite side of said subject from the source of Roentgen radiation, the said screen being related to the film to produce a substantially constant level film-speed factor throughout the range of radiation quality employed.

5. A device for determining the correct Roentgen exposure for a Roentgen film necessary for a satisfactory roentgenogram of a subject comprising a phototube, means for measuring the output of said phototube and means to convert Roentgen radiation to visible radiation mounted between the phototube and the source of Roentgen radiation and on the opposite side of said subject from the source of Roentgen radiation, said means being related to the film to produce a substantially constant level film-speed factor throughout the range of radiation quality employed.

6. A device for determining correct Roentgen exposure for Roentgen films to be exposed with intensifying screens necessary for a satisfactory roentgenogram of a subject comprising a calcium-tungstate fluorescent screen with an overlying filter positioned to receive radiations passing through said subject, a phototube arranged to receive radiations from said fluorescent screen and means for measuring the output of said phototube, said device having a response to X-rays throughout the portion of the spectrum used in Roentgenography, parallel to the response of films exposed with intensifying screens.

7. An apparatus for determining the correct Roentgen exposure for Roentgen films to be exposed with or without intensifying screens necessary for a satisfactory roentgenogram of a subject comprising a source of Roentgen rays and a light-proof case positioned on the opposite side of said subject from the source of Roentgen rays, said case containing a phototube, means to measure the output of said phototube, fluorescent means adapted to excite said phototube, said means comprising a fluorescent screen movably mounted in said case and means to move said screen in front of said phototube and away from said phototube, said apparatus indicating the correct exposure for films to be exposed with intensifying screens when said movable fluorescent screen is in front of said phototube and indicating the correct response for films to be exposed without intensifying screens when said movable fluorescent screen is away from said phototube.

8. An apparatus for determining the correct Roentgen exposure necessary for a satisfactory roentgenogram of a subject comprising a phototube, a light-proof case surrounding said phototube, means to measure the output of said phototube, a fluorescent screen having a definite response to Roentgen radiation mounted in front of said phototube, a second fluorescent screen having a different response than the first mentioned fluorescent screen movably mounted in said light-proof case and means to move the second screen to a position in front of said phototube and away from said position.

9. In combination with an apparatus for determining Roentgen film exposure a light-proof case containing a phototube, means to measure the output of said phototube, a zinc-sulphide fluorescent screen mounted in said case in front of said phototube said zinc-sulphide fluorescent screen and phototube combination having the same response to Roentgen radiation throughout the portion of the spectrum employed as a Roentgen film exposed without intensifying screens, a second fluorescent screen movably mounted in said case and means to move said second screen in front of said phototube the combination of the two screens and the phototube having the same response to Roentgen radiation throughout the portion of the spectrum employed as a Roentgen film exposed with an intensifying screen.

10. In combination with an apparatus for determining Roentgen exposure for Roentgen films a light-proof case containing a phototube, means to measure the output of said phototube, a fluorescent screen movably mounted in said case and means to move said fluorescent screen to a position in front of said phototube said apparatus with said screen in front of said phototube having the correct response for indicating the exposure for a film to be exposed with an intensifying screen, and away from said position said apparatus with said screen away from said phototube having the correct response for indicating the exposure for a film to be exposed without intensifying screens; and an indicator controlled by said means to indicate the position of said screen.

11. In combination with an apparatus for determining Roentgen exposure for Roentgen films a light-proof case containing a phototube and a fluorescent screen, means to measure the output of said phototube, a lever mounted outside of said case for moving said fluorescent screen to a position to intercept Roentgen rays falling on said phototube, said apparatus with the screen intercepting the Roentgen rays having the correct response for indicating the exposure for a film to be exposed with an intensifying screen and away from said position, said apparatus with the screen away from said position having the correct response for indicating the exposure for a film to be exposed without intensifying screens, and a contact on said lever connected to an electrical indicator.

12. Apparatus for determining correct Roentgen exposure for Roentgen films comprising a phototube in circuit with a galvanometer, means for converting X-ray energy into light energy exposed to said phototube and means in circuit with said galvanometer and said phototube for controlling the amount of potential on said phototube said means having a dial calibrated in terms of Roentgen film speed.

13. An apparatus for determining X-ray exposure for a Roentgen film necessary for a satisfactory roentgenogram of a subject comprising a source of Roentgen radiation, a fluorescent screen for collecting a portion of the energy in the form of X-rays passing through said subject and giving it off in the form of visible radiation; a phototube provided with a cathode for collecting said visible radiations, a series of dynodes for multiplying the output of said cathode, and an anode; and a milliammeter connected to said anode for indicating the unamplified output of said anode said apparatus having the same response to X-rays throughout the portion of the X-ray spectrum used in roentgenography as does the Roentgen film.

14. A device for determining the correct Roentgen exposure for a Roentgen film comprising a phototube, a meter for measuring the output of said phototube selectable fluorescent means adapted to provide a plurality of different responses to Roentgen radiation, said means including a plurality of fluorescent screens mounted above said phototube and means to place one or more of said screens between the source of Roentgen radiations and the phototube.

15. Apparatus for determining correct exposure for a Roentgen film necessary for a satisfactory roentgenogram of a subject comprising a fluorescent screen positioned to receive a portion of the Roentgen radiations passing through said subject, a phototube for receiving radiations from said screen, means for measuring the output of said phototube and a stabilized source of power for the phototube said apparatus having the same response to Roentgen rays throughout the X-ray spectrum as does the said Roentgen film.

16. Apparatus for determining correct Roentgen exposure for a Roentgen film comprising a phototube in circuit with a microammeter, fluorescent means interposed between the Roentgen ray source and said phototube and a potentiometer for controlling the current flowing from the phototube to the microammeter, said potentiometer having a dial calibrated in terms of Roentgen film speed, said apparatus having the same response to Roentgen rays throughout the X-ray spectrum as does the said Roentgen film.

17. A device for determining correct exposure of a Roentgen film necessary for a satisfactory roentgenogram of a subject comprising a phototube positioned to receive radiation passing through said subject, means for measuring the output of said phototube, selectable fluorescent means comprising a plurality of fluorescent screens mounted above said phototube, said fluorescent means being adapted to provide a plurality of selectable fluorescent structures having mutually different responses to Roentgen radiation and screen moving means for selectively effecting disposition of desired fluorescent structures between the phototube and the subject, said device having the same response to Roentgen radiation throughout the X-ray spectrum with one fluorescent structure between the phototube and the subject as a Roentgen film exposed without intensifying screens and having the same response with a second fluorescent structure between the phototube and the subject as a Roentgen film exposed with an intensifying screen.

18. An apparatus for determining the correct Roentgen exposure for Roentgen films to be exposed with or without intensifying screens, necessary for a satisfactory roentgenogram of a subject comprising a source of Roentgen rays, a light-proof case positioned on the opposite side of said subject from the source of Roentgen rays, a phototube in said case, means to measure the output of said phototube, a fluorescent screen mounted in said case between the phototube and the source of Roentgen rays, said screen and phototube combination having a response to Roentgen rays parallel throughout the X-ray spectrum to the response of Roentgen films exposed without intensifying screens, a second fluorescent screen mounted in said light-proof case and means to move said second fluorescent screen to a position in front of said phototube and away from said position, the combination of the first and second screen and the phototube having a response to Roentgen rays parallel to the response of Roentgen films exposed with intensifying screens.

19. The method of determining correct Roentgen exposure for a selected Roentgen film necessary for a satisfactory roentgenogram of a subject comprising the steps of selecting a Roentgen responsive light-emitting member having a light-emitting response proportional to the Roentgen radiation response of the selected Roentgen film throughout the range of Roentgen ray quality employed in roentgenography, exposing said member to Roentgen rays of selected quality through the subject to be roentgenographed, measuring the light emitted by said member, exposing the selected Roentgen film through said subject to Roentgen rays of said selected quality and controlling the time of exposure in accordance with the measured light of said member.

20. The method of determining correct Roentgen exposure for a selected Roentgen film necessary for a satisfactory roentgenogram of a subject comprising the steps of selecting a combination of Roentgen responsive light-emitting means and light-detecting means in operative relationship having a combined response directly proportional to the response of said selected Roentgen film to Roentgen radiation throughout the range of Roentgen ray quality used in roentgenography, exposing said means through said subject to Roentgen rays of selected quality, measuring the light detected by said light-detecting means, exposing the selected Roentgen film through said subject to Roentgen rays of said selected quality and controlling the time of exposure in accordance with the measured light detected by the light detecting means.

RUSSELL H. MORGAN.
PAUL C. HODGES.